United States Patent [19]

Pavia

[11] 4,196,081
[45] Apr. 1, 1980

[54] APPARATUS FOR EMERGENCY WATER PURIFICATION

[76] Inventor: Edgar H. Pavia, 431 Gravier St., New Orleans, La. 70130

[21] Appl. No.: 896,011

[22] Filed: Apr. 13, 1978

[51] Int. Cl.² .............................................. B01D 27/02
[52] U.S. Cl. .................................... 210/94; 210/283; 210/284
[58] Field of Search ....................... 210/27, 29, 37, 38, 210/40, 73 R, 73 S, 94, 95, 258, 266, 282–284, 287, 288, 290, 316, 317, 416 DW, 435, 439

[56] References Cited

U.S. PATENT DOCUMENTS

| | | | |
|---|---|---|---|
| 2,869,724 | 1/1959 | McDevitt | 210/94 |
| 3,266,628 | 8/1966 | Price | 210/266 |
| 3,327,859 | 6/1967 | Pall | 210/266 |
| 3,519,134 | 7/1970 | Hassinger | 210/283 |
| 3,715,035 | 2/1973 | Teeple et al. | 210/284 |
| 3,841,484 | 10/1974 | Domnick | 210/95 |
| 3,950,253 | 4/1976 | Stern | 210/416 DW |
| 3,985,648 | 10/1976 | Casolo | 210/37 R |

Primary Examiner—Charles N. Hart
Assistant Examiner—Ivars Cintins
Attorney, Agent, or Firm—Bard & Groves

[57] ABSTRACT

A method and apparatus for the purification of water in emergency situations is provided, comprising a manually operated pump having a discharge port connected to a plurality of series-connected treatment filters. Each filter is chosen for its ability to perform a desired purification function in a preferred sequence which enhances the performance of the subsequent filter in the series. The filters are designed to accept water from a contaminated source, thereafter removing particulate matter, organic impurities and inorganic impurities, and finally physically filtering out bacteria and other organisms larger than 0.20 microns in size to deliver potable water from the outlet port of the final filter. Preferably, all components are mounted in a suitable portable enclosure for ease of storing and for transporting the unit to a water source in an emergency situation.

9 Claims, 6 Drawing Figures

U.S. Patent
Apr. 1, 1980
4,196,081
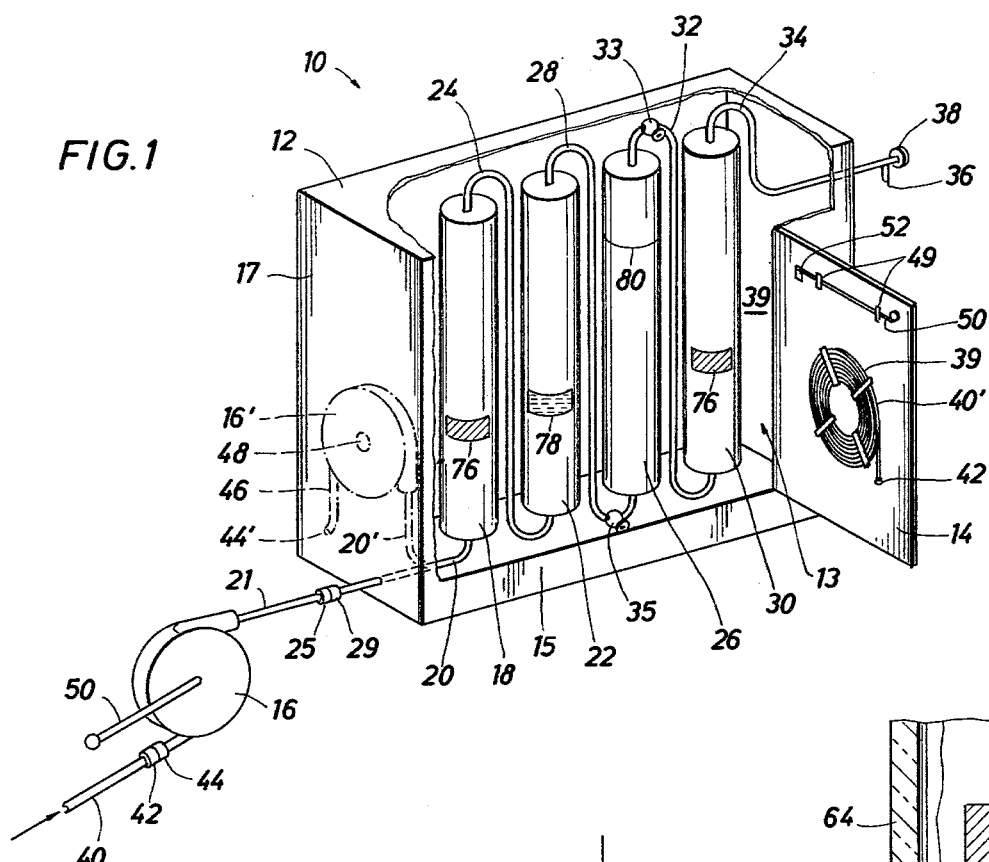
FIG. 1
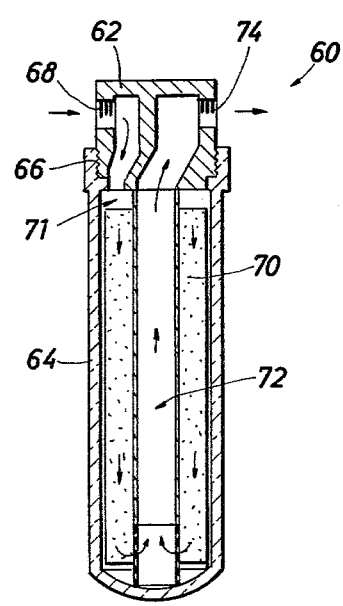
FIG. 2
FIG. 3
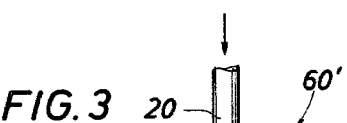
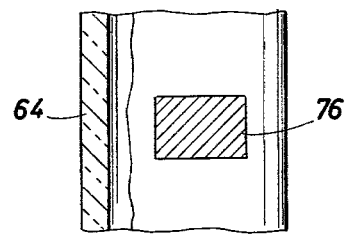
FIG. 4
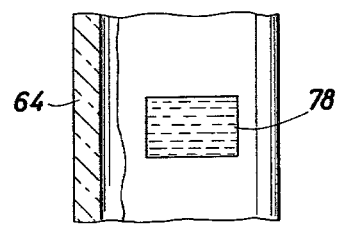
FIG. 5
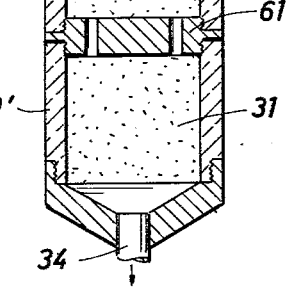
FIG. 6

APPARATUS FOR EMERGENCY WATER PURIFICATION

BACKGROUND OF THE INVENTION

1. Field of the Invention

The invention relates to water purification and, in particular, to a light, compact and portable system capable of providing potable water from a contaminated source in an emergency when no electrical power is available.

2. Description of the Prior Art

In the prior art, various types of filtration systems have been used to remove impurities from water. Some systems have been directed to removing particulate matter from the water. Others have been directed to removing organic and inorganic impurities carried by the water. In recent years, home type filtration units have become available. Generally, there are simple devices directed to the use of an activated charcoal bed and intended merely to remove taste and odor producing impurities from already potable water of a community water system. As these systems are designed to be used with the community water system, the pressure present in the system is used to displace the water through the filter. Unfortunately, emergency situations may arise in which the pressure of the community system may be interrupted. As a result, the above-described home-type filter units become inoperative.

Additionally, a need exists for a light, compact system capable of converting small quantities of contaminated water to potable water in remote, out-of-the-way locations where neither electricity nor water pressure are available. One such prior art method requires the use of chemicals, such as halazone tablets, to effect destruction of any bacteria present. However, the tablets are ineffective to remove such impurities as minerals, particulate matter and odor and taste producing impurities. In fact, such tablets usually add another unpleasant odor and taste to the water. Further, relatively large amounts of the chemicals are required in relation to the quantity of drinkable water obtained.

Additionally, various prior art devices have utilized filtration systems to remove impurities, however, such systems are directed either to use of gravity to draw the fluid through the filter bed, or use of a pressuirzed system to force the water through the filter bed. In the first case, use of gravity to draw the water through the filter bed is a slow process, requiring long time periods to accumulate sufficient water for use. Alternatively, the use of a pressurization system in a portable water purification unit generally requires complex, involved apparatus to position the pressurization medium for forcing the water through the filter system. Accordingly, such systems are cumbersome and not easily transportable.

The deficiencies of the prior art are overcome by the present invention wherein apparatus is provided for upgrading contaminated water to potable water in situations and locations wherein electric power or pressurized water sources are unavilable.

SUMMARY OF THE INVENTION

The present invention provides an apparatus for upgrading surface and ground waters to potable water quality which meets the requirements of the 1977 U.S. Environmental Protection Agency Primary Drinking Water Standards. The unit is designed to be used in remote areas where potable water sources may not be available, and, in times of emergency when the availability of electrical power and pressurized potable water sources may be interrupted. Accordingly, a manual pump is provided for displacing contaminated water through a series of filter beds, each of which is designed not only to perform a specific filtration function, but to enhance the filtration performance of the subsequent filter bed in the series. Thus, large particulate matter is removed first to prevent clogging of the remaining filters. Next, organic impurities, such as taste and odor producing impurities, are removed to prevent contamination of the mixed ion exchange resins of the subsequent bed. Thereafter, metallic inorganic impurities are removed. In the final filter bed, particulate matter greater than 0.20 microns is removed, thus removing organisms as small as salmonella bacteria and including *E. coli* bacteria. The water thus obtained from the device is potable and meets the 1977 U.S. EPA drinking water standards.

It is a feature of the present invention to provide a water filtration unit which will upgrade untreated or contaminated water to meet the 1977 EPA drinking water standards.

It is a further feature of the present invention to provide a portable apparatus for use in remote locations which will upgrade contaminated water to potable water purification standards including eliminating bacteria larger than 0.20 microns.

It is another feature of the present invention to provide a lightweight, portable water purification system which may be easily transported to remote areas.

It is still a further feature of the present invention to provide a water purification system which may be utilized during times of emergency when electrical power and pressurized potable water are not available.

These and other features and advantages of the present invention will become apparent from the following detailed description when considered in conjunction with the accompanying drawings.

BRIEF DESCRIPTION OF THE DRAWINGS

In order that the manner in which the above-recited advantages and features of the invention are attained can be understood in detail, a more particular description of the invention may be had by reference to specific embodiments thereof which are illustrated in the appended drawings, which drawings form a part of this specification. It is to be noted, however, that the appended drawings illustrate only typical embodiments of the invention and therefore are not to be considered limiting of its scope when the invention may admit to further equally effective embodiments.

In the drawings:

FIG. 1 is a perspective partly cut-away view showing the water purification system of the present invention disclosing a manually-operated pump, and the series-connected filter elements.

FIG. 2 is a vertical cross-sectional view of one type of conventional filtering unit such as may be used in the system shown in FIG. 1.

FIG. 3 is a vertical cross-sectional view of a second type of conventional filtering unit such as may be used in an alternate embodiment of the system shown in FIG. 1.

FIG. 4 is a partial, vertical cross-sectional view of a portion of the transparent filter housing showing a tan comparison mark on the housing exterior.

FIG. 5 is a view similar to FIG. 4, but showing a grey comparison mark on the housing exterior.

FIG. 6 is a view similar to FIG. 4, but showing a circumferential location mark around the housing exterior.

DETAILED DESCRIPTION OF THE PREFERRED EMBODIMENT

Referring now to FIG. 1, the water purification system 10 of the present invention is shown to include a housing 12 forming an interior compartment 13. Access doors 14 (one of which is shown) are conventionally interposed in one wall 15 of housing 12 to permit access to the interior compartment 13.

Preferably, a manually-operated, positive displacement type pump is provided and, as will be hereinafter explained, in use is positioned adjacent the exterior of end wall 17. Pump 16 includes a hand crank 50 allowing operation of the pump by rotating crank 50 in a conventional manner. Water from a local source is provided to the input port of pump 16 through a hose fitting 44 and a flexible hose 40 coupled at one end to fitting 44 by a mating hose fitting 42. The other end of hose 40 is positioned in the local water source.

Four filter units, 18, 22, 26 and 30, respectively, are shown positioned in interior compartment 13. The filter units may be mounted in any conventional manner within housing 12, but are interconnected in a predetermined order as will be hereinafter explained. Filter unit 18 comprises a replaceable-cartridge, physical filter having pore openings of 10 microns and is designed to remove large particulate matter. The input of filter 18 is connected to a hose fitting 29 mounted in end wall 17 with a flexible hose 21 connected to fitting 29 by a mating fitting 25. The other end of hose 25 is connected to the outlet port of pump 16.

Filter unit 22 is a treatment filter which comprises a granulated activated carbon bed for removing organic impurities, such as taste and odor producing impurities, from the water passing therethrough. The input port of filter unit 22 is connected to the discharge port of filter unit 18 by tubing 24. Filter unit 26 is another treatment filter which comprises a mixed-bed deionization resin filter selected to remove those metallic, inorganic impurities which are specified in the EPA drinking water standards of 1977. The inlet of filter unit 26 is connected to the discharge port of filter unit 22 by tubing 28.

Prior wetting of the mixed-bed deionization resin is required to insure maximum ion exchange with the contaminated water passing through the resin bed. When the bed is first wetted, ion exchange efficiency is extremely low. A period of several hours after wetting is required for ion exchange to reach maximum efficiency, a time period which is unacceptable in an emergency situation requiring use of the apparatus.

Accordingly, water is introduced into filter 26, wetting the resin bed and the inlet and discharge ports of filter unit 26 are then sealed by a suitable easily-opened sealing means to prevent loss of the water. By way of example, a manually operated valve 35 is shown interposed in filter inlet tubing 28, and a second manually operated valve 33 is shown interposed in discharge port tubing 32. With valves 33 and 35 closed, the introduced water will be retained in the resin bed. During operation of the system 10, however, valves 33 and 35 would be open permitting flow of contaminated water through filter 26.

Filter unit 30 comprises another absolute or physical filter similar to filter unit 18. However, filter unit 30 has pore openings of 0.20 microns to permit filtration of E. coli, salmonella and other water-borne bacterial organisms which can cause disease. The inlet of filter unit 30 is connected to the discharge port of filter unit 26 by tubing 32. Additionally, the discharge port of filter unit 30 is connected by tubing 34 to an outlet 36 mounted in wall 39. A manual valve 38 is interposed in tubing 34 at outlet 36 to control the flow of water discharged from outlet 36.

With the filter units 18, 22, 26 and 30 connected as above-described, the pressure drop across system 10 is less than 5 p.s.i. As a single person operating pump 16 may generate a greater pressure, pump 16 is fitted with a conventional flow restricting device (not shown) to prevent overload damage to the filter units.

Additionally, it may be desirable to provide filter unit housings of alternating sizes to insure the pressure drop across the filters is within the preselected limit and to aid in preventing overload damage to the filter units. By way of example only, filter unit housings having a 4 inch diameter are provided for filters 18 and 26 and filter unit housings having a 3 inch diameter are provided for filters 22 and 30.

In an alternate embodiment, shown in dashed lines, a small manually-operated positive displacement pump 16', having a discharge flow rate comparable to pump 16, may be conveniently mounted within compartment 13 and positioned adjacent end wall 17. In this embodiment, a pump handle engagement fitting 48 extends through wall 17 to the exterior of housing 12. Water from a local source is provided to pump 16' through a hose fitting 44' to the input port of pump 16'. The input of filter 18 is connected to the discharge port of pump 16' by tubing 20'.

A hose mounting reel 39 is shown connected to the interior surface of one access door 14 and is used for storage of a length of flexible hose 40' having a hose coupler 42' attached to one end of the hose for attachment to fitting 44. Coupling 42' may be designed to mate with fitting 44' by any suitable fastening means, such as screw threads (not shown).

Also mounted on the interior side of access door 14 by suitable mounting brackets 49, is a pump hand crank 50', having a crank engagement fitting 52 at one end and which is designed to engage the pump handle fitting 48 interposed in end wall 17 for purposes to be hereinafter discussed.

Referring now to FIG. 2, a conventional filter assembly 60 of a type which may be utilized in the invention is shown. Filter assembly 60 includes a cap 62 and cylinder body 64 connected by suitable fastening means such as the mating threads 66 shown. In use, water enters inlet port 68 flowing downward through the filtration bed provided by a replaceable filter element 70 positioned in an outer annular chamber 71. The water then flows through filter element 70 to a central interior chamber 72 to outlet port 74 for passage out of the assembly 60.

Although the use of filter assemblies, such as shown in FIG. 2, for each of the four filter units 18, 22, 26 and 30 is preferable, for other embodiments it may be advantageous to provide one long filter assembly 60', as shown in FIG. 3, with separator plates 61 between each filter section 18', 22', 26' and 30'. However, placement of the cartridges in the above-described functional order is important to assure maximum operating efficiency of each cartridge. Thus, the removal of large particulate matter as a first step by a replaceable filter cartridge 19 having a 10 micron pore size, will enable the succeeding steps in the filtration process to operate at higher efficiency since the remaining beds will not be blocked by entrained particulate matter. For other embodiments, it may be preferable to provide several successive beds combined in a single cartridge (not shown) for use in filter assembly 60 shown in FIG. 2.

Further, placing filter unit 22', containing the activated carbon bed 23 ahead of filter unit 26' containing the mixed bed deionization resin 27, prevents organic contamination of the resin, thereby enhancing filter 26' efficiency. Finally, the use of the 0.20 micron pore-opening absolute filter as the final filter bed 31 removes a large portion of water borne bacteria without the danger of being clogged by larger particulate matter which has been removed through the preceding three filter units.

Referring now to FIGS. 1 and 2, during operation, water purification system 10 is positioned adjacent a source of probable contaminated water and pump 16 is positioned between housing 12 and the water source. Hose coupler 42 at one end of hose 40 is then mated to pump input fitting 44. Pump hose coupling 25 is mated to filter tubing coupling 29. The remaining extremity of the flexible hose 40 may then be placed in the water source.

A suitable container or receptacle (not shown) is positioned under water outlet 36 and valve 38 is opened to permit passage of water therethrough. Rotating the crank in a conventional manner operates the pump, drawing water from the source, into the pump and then forcing it through the successive filtration units.

As water is displaced from pump 16 through filter unit 18, particulate matter 10 microns or larger is removed by the replaceable filter element therein. As more water is displaced into unit 18, the filtered water is displaced through tubing 24 into filter unit 22. The large particulate filtered water displaced through filter unit 22 is passed through activated carbon, a non-ionic material, to remove selected organic materials from the contaminated water such as impurities which cause unpleasant odors and taste. Further, selected carcinogens, such as trihalomethanes, can be removed by passage of the contaminated water through the activated carbon.

The water is discharged from filter unit 22 through tubing 28 and into filter unit 26 which contains positively and negatively charged resins. As the water passes through the filter bed, various minerals which are themselves ionized are exchanged with the ions in the structure of the resins. Accordingly, positive cations in the water are exchanged for hydrogen ions in the resin and negatively charged anions are exchanged for hydrogen oxide ions in the resin structure. Thus, the mixed bed resin is utilized to remove a large number of metallic, inorganic impurities which also affect the quality, taste and odor of the water passing therethrough. As before-mentioned, the operation of the mixed-bed resin filter is enhanced by prior removal of organic materials by filter unit 22.

The water is discharged from filter unit 26 through tubing 32 into the final, absolute filter unit 30, which provides a replaceable cartridge filter having 0.20 micron pore openings therein. These openings are sufficiently small to remove all *E. coli*, which has been accepted as the indicator organism for bacterial contamination in water, and which will not pass a 0.45 micron opening. In addition, the filter cartridge will remove pseudomonas and salmonella bacterial organisms, each of which is larger than 0.20 microns. Thus, the use of the absolute filter will insure that water leaving the unit is free of most bacteria even though bacteria can breed in the upstream cartridges.

In the alternate embodiment having the pump 16' mounted in the housing 12, the additional steps of opening access door 14 and removing hose 40' from reel 39 and handle 50' from brackets 49 must be accomplished. Hose coupler 42' is mated to pump coupler 44' as above-described. However, in this embodiment, pump hose 20; is connected directly to filter 18. Next, pump crank engagement fitting 52 is mated to pump fitting 48 and the system is then operated as has been above-described.

As in all devices using replaceable element cartridges, the present invention operates at high efficiency during the useful life of the cartridge element. It becomes necessary to ascertain when a cartridge element has reached the limits of its useful life. Accordingly, in the present invention, cylinder body 64 would preferably be made of a transparent material so that the condition of the cartridge element within can be monitored continuously by the operator. Additionally, color coded markings placed on the exterior of the appropriate filter unit can be used to give a ready indication of the approach of the end of the cartridge's useful life. Referring now to FIG. 4, in the filter units 18 and 30, the physical filter units, the end of the useful life of the cartridges may be ascertained by the change in the filter cartridge from white to muddy tan. Thus, a tan comparison mark 76 placed on the exterior of physical filters 18 and 30 permits the user to visually ascertain when the cartridge requires replacement.

Referring now to FIG. 5, the exhaustion of the granular activated carbon results in a change in color from deep black to grey. Accordingly, a grey comparison stripe 78 marked on the side of transparent cylinder body 64 of filter unit 22 would visually indicate the completion of the useful life of the carbon filter cartridge.

Exhaustion of the mixed bed ionic exchange resin in filter unit 26 can be determined by monitoring the shrinkage of the bed within cylinder body 64. Accordingly, a mark 80 is positioned circumferentially around cylinder 64. Shrinkage of the filter cartridge to the mark location indicates the end of the useful life of the mixed bed ion exchange resin and the filter would be replaced.

It is apparent that the use of the filter shown in the filter of FIG. 2 in the system of FIG. 1 permits the replaceable cartridges used for filtering contaminated water to be replaced individually as each one is exhausted, thus insuring the maximum use from each cartridge.

Although specific embodiments have been described in detail hereinbefore, it is understood that the subject invention is not limited thereto, and all variations and modifications thereof are contemplated and are included within the spirit and scope of the invention as defined by the appended claims.

What is claimed is:

1. Apparatus for providing potable water from a contaminated source, comprising
   a manually operated pump having an inlet for drawing contaminated water from the source and an outlet for providing a pressurized stream of water;
   first filtering means in communication with said pump outlet for receiving from said pump said pressurized contaminated water and filtering therefrom coarse particulate matter of 10 microns in size and greater, said first filtering means having an outlet for effluent, first treatment means in communication with the outlet of said first filtering means for receiving said pressurized water from said first filtering means and removing selected organic impurities therefrom, said first treatment means having an effluent outlet, second treatment means having an inlet in communication with the outlet of said first treatment means for receiving said pressurized water from said first treatment means and removing selected metallic inorganic impurities therefrom and further having an effluent outlet therein, second filtering means having an inlet in communication with said effluent outlet of said second treatment means for receiving said pressurized water from said second treatment means and for removing fine particulate matter including organisms of 0.20 microns in size and greater and further having an effluent outlet therein, said first treatment means being a granulated activated carbon bed for removing from said water unpleasant odors, taste, and selected carcinogens, said second treatment means being a mixed-bed deionization resin material wherein positive cations in the water are exchanged for hydrogen ions in the resin and negatively charged anions are exchanged for hydrogen oxide ions in the resin, the pore openings of said second filtering means being sufficiently small to remove from the water all *E. coli,* and pseudomonas and salmonella bacterial organisms larger than 0.20 microns, said filtering and treatment means each comprising, a tube-like housing member having a substantially transparent wall portion and further having an inlet and an outlet port for receiving and discharging said stream of contaminated water at not greater than a preselected flow rate, a permeable element removably disposed in said housing member across said stream of water and at least partially adjacent said transparent wall portion, said housing further having an indexing mark disposed adjacent said transparent wall portion for providing a visible indication of the condition of said element.

2. The apparatus described in claim 1, wherein said first filtering means is interconnected with said pump means and said first treatment means for receiving and passing said stream of contaminated water at a flow rate not greater than the maximum flow-through capacity of said first treatment means.

3. The apparatus described in claim 2, wherein said second treatment means is interconnected with said first treatment means and said second filtering means for receiving and passing said stream of contaminated water at a flow rate not greater than the maximum flow-through capacity of said second filtering means.

4. The apparatus described in claim 3, wherein said filtering and treatment means are interconnected with said pump means for passing said stream of contaminated water with an aggregate pressure drop not greater than 5 psi between said pump means and said outlet opening of said second filtering means.

5. The apparatus described in claim 4, wherein said treatment element in said first treatment means is composed of granular activated carbon and said treatment element in said second treatment means is composed of mixed-bed deionization resin.

6. The apparatus of claim 5 wherein each said filtering and treatment means are supported in separate and distinct housings each formed at least partially of a substantially transparent material.

7. The apparatus of claim 6 including visual indicator means comprising a color coded mark disposed on the transparent housing of each said first filtering means, said first treatment means, and said second filtering means, respectively, for visual comparison with the color of the media therein, and a circumferentially positioned mark disposed on the transparent housing of said second treatment means for visual comparison with the height of resin therein.

8. The apparatus of claim 5 wherein each said filtering and treatment means are each supported in a single substantially transparent housing with the media of each filtering and treatment means arranged therein for serial flow through said housing.

9. The apparatus of claim 8 including visual indicator means comprising a color coded mark disposed on the transparent housing adjacent each said first filtering means, respectively, for visual comparison with the color of the media therein, and a circumferentially positioned mark disposed on the transparent housing adjacent said second treatment means for visual comparison with the height of resin therein.

* * * * *